United States Patent [19]

Lemelson

[11] Patent Number: 5,387,942

[45] Date of Patent: Feb. 7, 1995

[54] SYSTEM FOR CONTROLLING RECEPTION OF VIDEO SIGNALS

[76] Inventor: Jerome H. Lemelson, Suite 286, Unit 802, 930 Tahoe Blvd., Incline Village, Nev. 89451-9436

[21] Appl. No.: 157,887

[22] Filed: Nov. 24, 1993

[51] Int. Cl.$^6$ .................... H04N 5/44; H04N 7/093
[52] U.S. Cl. .................... 348/474; 348/479; 348/10; 348/633; 348/634; 348/553
[58] Field of Search ............ 348/474, 479, 476, 460, 348/461, 473, 634, 633, 632, 10, 553, 906, 465, 552, 725; 380/5; H04N 5/44, 5/00, 7/093.01, 7/08, 7/167, 7/16; 455/4.2, 6.2; 358/349, 908; 340/825.56, 825.31

[56] References Cited

U.S. PATENT DOCUMENTS

| | | | |
|---|---|---|---|
| 4,158,874 | 6/1979 | Ellsberg | 340/825.31 X |
| 4,318,125 | 3/1982 | Shutterly | 348/476 X |
| 4,554,584 | 11/1985 | Elam et al. | 348/461 |
| 4,605,964 | 8/1986 | Chard | 348/461 |
| 4,888,796 | 12/1989 | Olivo, Jr. | 348/460 |
| 4,930,158 | 5/1990 | Vogel | 358/349 |
| 4,930,160 | 5/1990 | Vogel | 358/349 |
| 5,214,556 | 5/1993 | Kilbel | 360/137 |
| 5,253,066 | 10/1993 | Vogel | 348/460 |

Primary Examiner—James J. Groody
Assistant Examiner—Safet Metjahic
Attorney, Agent, or Firm—J. Kevin Parker

[57] ABSTRACT

A method and system for controlling the reception of video signals in accordance with the program content of the signals is disclosed. In accordance with the invention, a digital program code is simultaneously transmitted along with the audio and video information in an unused portion of the composite video signal, such as the so-called back porch region of the blanking interval. Circuitry is interposed between the video signal and the display generating circuitry of a television receiver which extracts such program code and either passes or blocks the reception and display of the video signal in accordance with a comparison between the extracted program code and a stored program code. The stored program code indicates those types of programs which are desired to be blocked from reception and display by the television receiver, such as programs containing violence, nudity, or strong language. The system may be employed to either block entire programs or only those portions of programs having an objectionable program content.

16 Claims, 2 Drawing Sheets

SYSTEM FOR CONTROLLING RECEPTION OF VIDEO SIGNALS

BACKGROUND AND SUMMARY OF THE INVENTION

Programs available for viewing on television receivers today vary greatly in their content of such things as violence, nudity, depictions of sexual acts, strong language, or other things some people may regard as obscene or otherwise objectionable. Moreover, such television programs are available from a wide variety of sources including cable television systems, prerecorded video on tape or laser disk, as well as conventional broadcasts over the airwaves. Many parents would like to control the program content of what their children watch on television but find it nearly impossible to do so without being continually present. It would be desireable for parents to be able to control what programs their television set is able to receive in an unattended manner.

In accordance with the present invention, video signals transmitted to a television receiver have encoded in select portions thereof program codes which are indicative of the video signal's program content. The program codes may represent an arbitrary number of designations which rate the program content according to what degree it contains graphic sex, violence, and strong language, for example. The program code may be any type defining the requisite information and may be included at any available location of the video signal. A preferred way of implementing the program code, however, is for the video signal to carry such a digital program code in the so-called back porch region of the signal's blanking signal, which portion of the video signal is otherwise unused. Before reaching the picture generation elements of the television receiver, the video signal is received by control circuitry which extracts the program code from the composite video signal and compares it with a preselected reception code which represents the program content which is desired to either block or allow the reception of by the television receiver. The reception code may only be changed by use of a security device, such as a key-operated switch or lock, to allow such access. After electronically comparing the program code and the reception code, the video signal is either passed to the television display or is blocked. Blocking of select video signals may be accomplished by automatically operating or opening a switch or any equivalent method which disrupts the signal and prevents normal viewing. The control circuitry which receives the video signal may be provided integral with the televison receiver or separate therefrom and physically secured to prevent it from being bypassed.

It is therefore a primary object of the present invention to provide a system and method for controlling what video signals a television receiver is able to receive and display for viewing based on the program content of the video signals transmitted.

It is a further object to provide a system and method for effecting such control of video signals in an unattended manner.

It is a further object to provide a system and method for effecting such control of video signals in accordance with selecting respective of a plurality of different program content designations or codes.

Other objects, features, and advantages of the invention will become evident in light of the following detailed description considered in conjunction with the referenced drawings of a preferred exemplary embodiment according to the present invention.

DETAILED DESCRIPTION OF THE INVENTION

Figure 1:
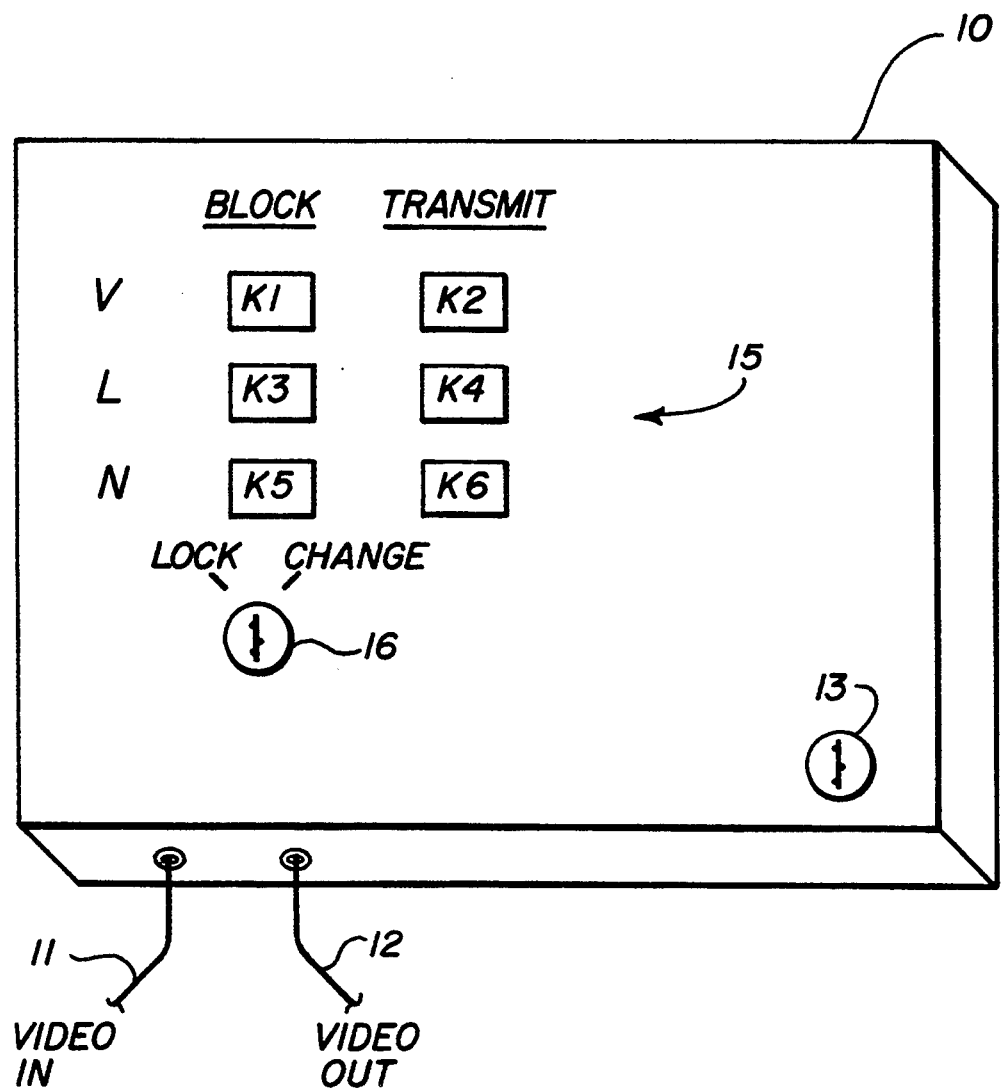
FIG. 1 is an isometric view of an exemplary housing and controls for the control circuitry which shows a keyboard for entering a reception code.

FIG. 1 shows an exemplary video reception control unit comprising a housing 10 containing the circuitry which controls the reception of video signals by a home television receiver. As aforesaid, the control circuitry may be constructed integral with a television receiver (or cable converter) or as a separate unit. In this embodiment, a separate unit is provided which receives video signals via video-in cable 11 and further transmits the signal via video-out cable 12. (As used herein, the term "video signals" shall be taken to mean both the video and audio portions of signals used for driving the display of a television receiver.) Video cables 11 and 12 are secured interior to housing 10, access to which is controlled by a key-operated lock 13 which allows the housing 10 to be opened. Such a construction prevents cables 11 or 12 from being disconnected from the housing 10 and routed directly to the television receiver by a determined child in order to bypass the control unit.

Mounted on the surface of the housing 10 are a keyboard 15 and a keyboard access lock 16, the latter being operated by a key in this embodiment. After inserting a key into access lock 16 and turning the lock to the "change" position, the keyboard is enabled to change the reception code. The reception code signifies which kinds of programs are allowed to be further transmitted from the control unit to a television receiver via cable 12. In this embodiment, a coding scheme is chosen which rates program content according to three rating criteria where V stands for violence, L for language, and N for nudity. A particular program may be designated with none, any, or all of these codes. The keyboard 15 allows a user to block or transmit a video signal according to its program content by depressing either the block or transmit key for each rating criteria. The result may thus be represented by a three digit binary code.

In order for the control unit to be able to detect what kind of programming a given video signal contains, the video signal must be transmitted from a broadcast station or video player with a three digit binary code according to the same coding scheme as described above. Video signals used for driving television receivers are complex waveforms carded by an amplitude-modulated carrier in the case of visual information and a frequency-modulated carrier for the audio portion of the signal. Part of every video signal includes so-called horizontal blanking pulses and sync pulses. Horizontal blanking pulses repeat at regular intervals and are of sufficient amplitude to "blank" the television screen after each horizontal scan of the electron beam across the picture tube screen. Associated with each such horizontal blanking pulse and in fixed time relation thereto is a horizonal sync pulse of even higher amplitude which triggers each horizontal scan of the electron beam. The region of the blanking pulse following the sync pulse is sometimes referred to as the "back porch" region of the composite video signal. Such pan of the video signal can be used to transmit other types of information (e.g., the "color burst" synchronizing waveform for color television) but is largely unused. In this embodment of the present invention, a three bit program code is transmitted in the back porch region of each horizontal blanking pulse in fixed time relation to the horizontal sync pulse. The program code may be transmitted using any convenient digital modulation method such as, for example, amplitude shift keying (ASK).

Figure 2:
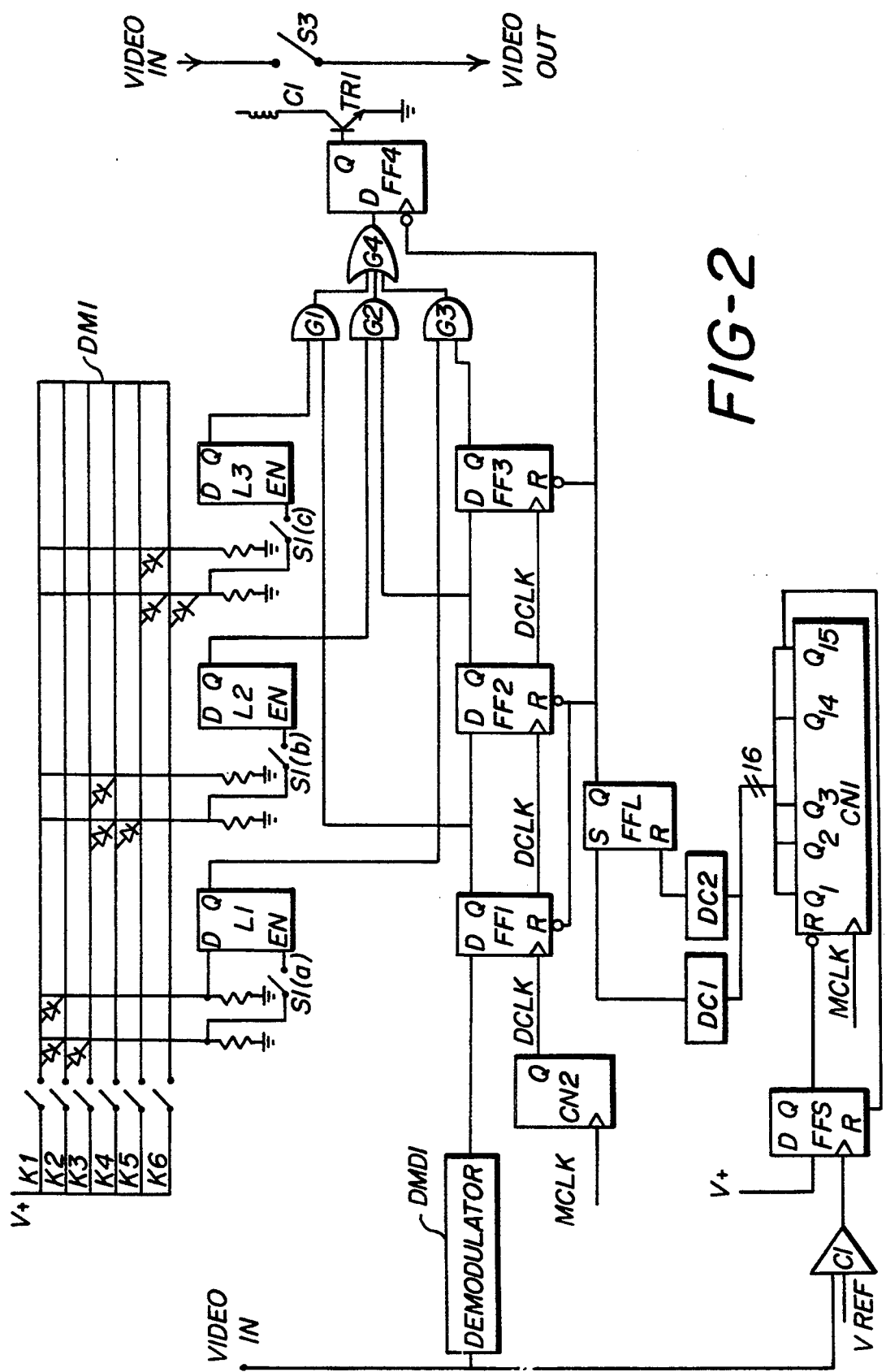
FIG. 2 is a schematic diagram of a particular implementation of the control circuitry of the present invention.

FIG. 2 is a schematic of a particular implementation of the control circuitry contained within housing 10. It is contemplated that such circuitry may be realized either by discrete components as described or fabricated on one or more integrated circuit chips. Of course, there are many equivalent ways of implementing the control functions using either discrete components or one or more programmable devices.

The reception code is entered through keyboard 15 by selectively depressing keys K1 through K6 after turning keyboard access lock 16 from the LOCK to the CHANGE position. FIG. 2 shows a diode matrix decoder DM1 which decodes the keyboard input into a three bit reception code which is stored in data latches L1 through L3. As shown, keys K1 and K2 control the state of latch L1, keys K3 and K4 control the state of latch L2, while keys K5 and K6 control the state of latch L3. Each key when depressed enables its respective latch via the EN port if switches S1(a) through S1(c) are closed. Lock 16 opens and closes switches S1(a) through S1(c) simultaneously. Thus latches L1 through L3 control the reception of programming rated V, L, and N, respectively. A "1" stored in the appropriate latch means that a video signal designated with that program content is not to be received, while clearing the latch allows reception.

The video signal is fed into demodulator DMD1 which, in this embodiment, is an amplitude shift keying demodulator. In order to locate where the program code occurs in the video signal, the video signal is also input to a comparator C1 which compares the signal's amplitude to $V_{ref}$, the amplitude of a horizontal sync pulse. Thus C1 acts as a sync pulse detector, outputting a positive pulse when the sync pulse arrives. The positive output of comparator C1 clocks a "1" into flip-flop FF5, the output of which enables counter CN1 by pulling the latter's reset line low. Counter CN1 is a 16-bit counter clocked by a master clock signal MCLK (generated by, for example, a crystal oscillator) and has output bits $Q_0$ through $Q_{15}$ which denote the time elapsed since the occurrence of a sync pulse. As described below, the time relation of the program code with respect to the sync pulse is fixed, and this information is used to extract the program code from the video signal. When $Q_{15}$, the most significant bit goes high, flip-flop FF5 is reset which clears the counter until another sync pulse is received.

The program code of the received video signal is assumed to occur a predetermined number of MCLK cycles after the occurrence of a sync pulse and last for another predetermined number of MCLK cycles. When the program code occurs, as indicated by the output of counter CN1, flip-flop FF6 is set. Flip-flop FF6 is an S-R flip-flop having its set input connected to decoder DC1 and its reset input connected to decoder DC2. Decoders DC1 and DC2 both receive the 16-bit output of counter CN land are configured such that the output of DC1 goes high during the MCLK cycle corresponding to the time when the program code begins while the output of DC2 goes high during the MCLK cycle corresponding to the time when the program code ends. When flip-flop FF6 is set, a shift register consisting of flip-flops FF1 through FF3 is enabled by pulling their reset lines low. The digital data from demodulator DMD1 is then serially clocked into the shift register by a data clock signal DCLK which corresponds to the clock signal used to generate the program code. In this embodiment, the frequency of MCLK is some integer multiple N of the frequency of DCLK, so that DCLK is derived by passing MCLK through a divide-by-N counter CN2.

When the output of decoder DC2 goes high, signifying the end of the program code bit sequence, flip-flop FF6 is reset causing its output to go low which when inverted resets the flip-flops FF1 through FF3. Before the data contained in the shift register is cleared, however, the negative going edge of the output of flip-flop FF6 clocks the output of OR gate G4 into flip-flop FF4. The inputs to OR gate G4 come from AND gates G1 through G3 which perform a bit by bit comparison of the reception code and the program code as represented by the data contained in latches L1–L3 and flip-flops FF1–FF3, respectively. If there are one or more matches, indicating that the program content of the video signal corresponds to a program content which it is desired to be blocked from reception and display, the output of OR gate G4 is high. When a 1 is thus clocked into flip-flop FF4 by the negative edge of the output of flip-flop FF6, the output of flip-flop FF4 goes (or is maintained) high which turns on transistor TRI and causes current to flow through coil C1. Coil C1, when energized, operates so as to open normally-closed switch S3 which prevents video program signals from being further transmitted to the television receiver display or picture tube via cable 12.

It should be noted that, while the code comparison and subsequent control functions are performed for every transmitted horizontal scan line in this embodiment, it is a simple matter to modify the system so that the functions are performed at any arbitrary interval such as, for example, every frame or multiple of frames. It should further be noted that the system and method described may be used to control the reception of entire programs or may be used to selectively block portions thereof in accordance with the transmitted program codes.

Although the invention has been described in conjunction with the foregoing specific embodiment, many alternatives, variations, and modifications will be apparent to those of ordinary skill in the art. Those alternatives, variations, and modifications are intended to fall within the scope of the following appended claims.

What is claimed is:

1. A method for controlling the reception and use of video signals by a television receiver, comprising the steps of:
   (a) storing a reception code indicative of a program content which it is desired to prevent from displaying by a television receiver;
   (b) receiving a video signal;
   (c) extracting a program code from a select portion of the received video signal, wherein such program code is indicative of the video signal's program content by detecting a select sync pulse in the received video signal, measuring elapsed time from the occurrence of the detected sync pulse, wherein the program code of the video signal occurs in a fixed time relation to the sync pulse, and clocking a digital signal corresponding to the program code into a memory; and, (d) comparing the extracted program code with the stored reception code to ascertain whether the video signal's program content matches the program content indicated by the reception code and, if so, blocking further receipt of such video signals by the display of the television receiver.

2. A method in accordance with claim 1 wherein the program code is located in a portion of the video signal in fixed time relation to a sync pulse of the video signal, and further wherein the extraction of the code is performed by detecting such sync pulse and timing therefrom.

3. A method in accordance with claim 2 wherein the program code occurs during a blanking interval of the video signal.

4. A method in accordance with claim 3 wherein the program code occurs in the back porch region of the blanking interval.

5. A method in accordance with claim 1 wherein steps (b) through (d) are performed for each frame of video information in the video signal.

6. A method in accordance with claim 1 wherein the program and reception codes are digital codes.

7. A method in accordance with claim 1 wherein the video signal is received via a cable television system.

8. A method in accordance with claim 1 wherein the video signal is received from the output of a video recorder.

9. A method in accordance with claim 1 wherein the video signal is received via short wave from a broadcast station.

10. A system for controlling the reception of video signals by a television receiver, comprising:

(a) a television receiver;
(b) a data storage device in which is stored a reception code indicative of a program content which is desired to be blocked from reception by the television receiver;
(c) first electronic circuitry for extracting a program code from select portions of the received video signals, wherein such program code is indicative of the program content of the received video signals, said first circuitry comprising a comparator for detecting a select sync pulse in the received video signal, a timer for measuring elapsed time from the occurrence of the detected sync pulse, wherein the program code of the video signal occurs in a fixed time relation to the sync pulse, and a shift register into which is clocked a digital signal corresponding to the program code;
(d) second electronic circuitry for comparing the extracted program code with the stored reception code to ascertain whether the program content of the received video signals matches the program content indicated by the reception code;
(e) third electronic circuitry for producing a comparison signal in accordance with the electronic comparison of the program and reception codes;
a switch operated by the comparison signal which switch controls the reception of the video signals by display generating circuitry of the television receiver.

11. A system in accordance with claim 10 further comprising a security device for controlling access to said data storage device in order to change the reception code stored therein.

12. A system in accordance with claim 11 wherein said data storage device is an array of data latches for storing said reception code in binary form and further wherein said security device is a key-operated switch controlling a data enable port of said data latches.

13. A system in accordance with claim 12 wherein said security device is a key-operated switch controlling a data enable port of said data latches.

14. A system in accordance with claim 11 wherein said comparison signal producing circuitry comprises a plurality of gates for comparing individual bits of the program code stored in said shift register and said reception code stored in said data latches.

15. A method in accordance with claim 1 wherein reception of entire programs are blocked.

16. A method in accordance with claim 1 wherein reception of only portions of an entire program are blocked.

* * * * *